D. P. Sharp.
Horse Rake.
N° 66894    Fig. 1.    Patented Jul. 16, 1867.
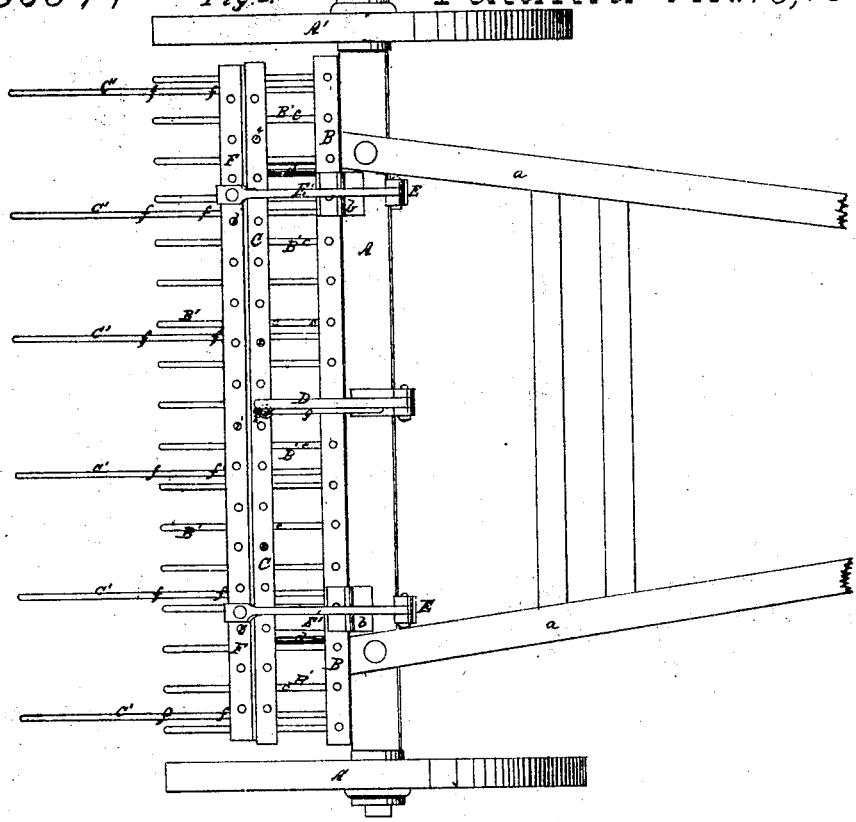
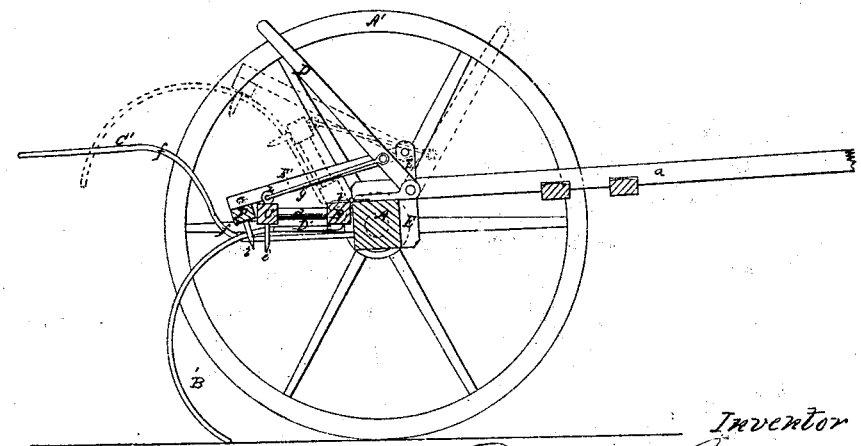
Witnesses:
Inventor
D. P. Sharp
Per his Attorneys
Brown Coombs & Co.

United States Patent Office.

D. P. SHARP, OF ITHACA, NEW YORK.

Letters Patent No. 66,894, dated July 16, 1867.

---

IMPROVEMENT IN HORSE-RAKES.

---

*The Schedule referred to in these Letters Patent and making part of the same.*

---

TO ALL WHOM IT MAY CONCERN:

Be it known that I, D. P. SHARP, of Ithaca, in the county of Tompkins, and State of New York, have invented certain new and useful improvements in Horse-Rakes; and I do hereby declare that the following is a full, clear, and exact description of the same, reference being had to the accompanying drawings, making a part of this specification, in which—

Figure 1 is a plan or top view of a horse-rake constructed according to my invention.

Figure 2 is a vertical longitudinal section of the same, taken in the line $x\ x$ of fig. 1.

Similar letters of reference indicate corresponding parts in both figures.

This invention relates to that class of horse hay-rakes known as wheeled rakes, and it consists in certain novel means whereby the teeth of the rake are much more effectually prevented from becoming clogged with hay or straw than has been the case with those heretofore in use.

To enable others to understand the construction and operation of my invention, I will proceed to describe it with reference to the drawings.

A shows the axle of the rake, which is furnished, in the ordinary manner, with supporting-wheels A' and with suitable shafts or thills $a$. The rake-head is represented at B, and is placed immediately behind the axle A, in a position parallel therewith, and is hinged to the said axle by means of hinges $b$. The rake-teeth B' are attached to the rake-head B in any suitable manner, and have their upper portions made straight, as shown at $c$, the remaining length of each tooth being curved downward into a nearly or quite semicircular form, as shown in fig. 2. C indicates a horizontal bar which is placed upon the straight portions $c$ of the teeth B', at a little distance from the rake-head B, in a position parallel therewith, and connected with the said head by short bars, $d$. A spur, $e$, projects downward, between each of the rake-teeth B', from the bar C just mentioned. Extending back from the axle A, and passing underneath the rake-head B and bar C, is a number of clearing-tines, C', which are situated at suitable distances apart, and which, instead of extending back in a straight line from the axle A, have their central portions curved upward, as shown at $f$, in order that the said tines C' may exert a more efficient action in clearing the rake-teeth, as will be hereinafter fully set forth. D represents a lever which is pivoted near the forward edge of the axle A, and is connected with the bar C by means of a rod, $g$, and eye-bolt, $h$, in such manner that when it is pushed forward it will raise or turn the said bar C and the rake-head B upon the hinges $b$, and thus raise the rake-teeth from the ground. Secured firmly to the front side of the axle A are two upright arms or standards E, in the upper ends of which are pivoted the forward ends of bars E', the rearmost ends of which are attached to a horizontal bar, F, which rests upon the rake-teeth B' in rear of the bar C, and parallel therewith, the said bar F being furnished with studs $i$, similar to the spurs $e$ of the bars C, and projecting downward between the rake-teeth in the same manner.

When it is desired to elevate the rake-teeth in order to dump or deposit the hay or straw gathered upon them, the lever D is forced forward as just hereinbefore explained, thus bringing the several parts into the position shown in red lines in fig. 2. As the rake-teeth B' are thus raised upward they pass between the clearing-tines C', and, inasmuch as the curved portions $f$ of the aforesaid clearing-tines are situated in a portion nearly transverse to the rake-teeth as they are drawn upward, it follows that any hay or straw that may cling to the tines will be much more easily and effectually swept off therefrom than would be possible if the aforesaid clearing-tines were straight and placed wholly in a horizontal position, it having been found by experience that when such straight clearing-tines are employed in connection with the curved rake-teeth the clinging hay or straw is extremely apt to bind or jam between the rake-teeth and the tines. Furthermore, as the rake-teeth are elevated to discharge the hay, as just described, the bar F is of course raised upward, turning around the pivots by which its bars E' are connected with the standards E. The rake-teeth being drawn forward, underneath the said bar F, and between the teeth or studs $i$ thereon, any hay or straw that may escape the action of the clearing-tines is pushed back upon the rake-teeth and thus prevented from getting upon the same far enough to clog or interfere with their proper operation. Inasmuch as the standards E are secured upon the axle A, the bars E' are tilted at a greater angle than would be the case if the said standards were situated farther forward, and the lower ends of the teeth or spurs $i$ are thrown farther back and more effectually clear the hay from the rake-teeth B', while, in case the bar F should be by any accident removed, or should any hay or straw by any means pass forward beyond the bar F, it will be stopped by the spurs $e$ on the bar C, and will thus be effectually prevented from accumulating on the upper portions of the tines. By these means the rake-teeth are effectually prevented from becoming clogged, and the most efficient operation of the rake is secured.

What I claim as new, and desire to secure by Letters Patent, is—

1. The spurs $e$, arranged upon the bar C, in combination with the rake teeth $B'$ and clearing-spurs $i$ on the bar F, operating substantially as herein set forth, for the purpose specified.

2. The lever D, rod $g$, and spurred bar C, arranged in relation with each other, and with the spurred bar F, bars $E'$, and standards E, substantially as herein set forth, for the purpose specified.

D. P. SHARP.

Witnesses:
I. W. STANSBURY,
D. T. TILLOTSON.